(12) United States Patent
Hsueh et al.

(10) Patent No.: US 7,959,898 B2
(45) Date of Patent: Jun. 14, 2011

(54) HYDROGEN SUPPLY DEVICE

(75) Inventors: Chan-Li Hsueh, Kaohsiung County (TW); Jie-Ren Ku, Kaohsiung (TW); Ya-Yi Hsu, Tainan County (TW); Shing-Fen Tsai, Tainan County (TW); Reiko Ohara, Tainan (TW); Chien-Chang Hung, Pingtung County (TW); Cheng-Yen Chen, Yongkang (TW); Ming-Shan Jeng, Sijhih (TW); Fanghei Tsau, Kaohsiung County (TW)

(73) Assignee: Industrial Technology Research Institute (TW)

( * ) Notice: Subject to any disclaimer, the term of this patent is extended or adjusted under 35 U.S.C. 154(b) by 158 days.

(21) Appl. No.: 12/493,014

(22) Filed: Jun. 26, 2009

(65) Prior Publication Data

US 2010/0266910 A1    Oct. 21, 2010

(30) Foreign Application Priority Data

Apr. 16, 2009   (TW) .............................. 98112619 A

(51) Int. Cl.
   *F17C 11/00*    (2006.01)
(52) U.S. Cl. ..................... 423/658.2; 429/421
(58) Field of Classification Search .......... 96/108, 96/154; 423/648.1, 658.2; 206/0.7; 420/900; 502/526; 429/408, 416, 421
See application file for complete search history.

(56) References Cited

U.S. PATENT DOCUMENTS

| | | | |
|---|---|---|---|
| 7,344,571 B2 * | 3/2008 | Bae et al. ......................... 48/61 |
| 2002/0182459 A1 | 12/2002 | Hockaday et al. |
| 2003/0228252 A1 | 12/2003 | Shurtleff |
| 2004/0071630 A1 | 4/2004 | Jorgensen |
| 2006/0237688 A1 | 10/2006 | Zimmermann |
| 2006/0257313 A1 * | 11/2006 | Cisar et al. ................. 423/648.1 |
| 2007/0253875 A1 | 11/2007 | Koripella et al. |
| 2008/0102024 A1 * | 5/2008 | Bae et al. ................... 423/648.1 |
| 2008/0299420 A1 | 12/2008 | Kelley et al. |
| 2008/0299423 A1 | 12/2008 | Laven |

FOREIGN PATENT DOCUMENTS

| | | | |
|---|---|---|---|
| CN | 101327907 | | 12/2008 |
| CN | 101327907 A | * | 12/2008 |
| CN | 101327909 | | 12/2008 |
| EP | 2 048 110 | | 4/2009 |
| TW | I229471 | | 9/2005 |
| TW | 200806392 | | 2/2008 |
| WO | WO 2008/132986 | | 11/2008 |

OTHER PUBLICATIONS

European Search Report from corresponding application No. EP 09 16 5066, dated Jul. 2010.

* cited by examiner

*Primary Examiner* — Frank M Lawrence
(74) *Attorney, Agent, or Firm* — Lowe Hauptman Ham & Berner, LLP

(57) ABSTRACT

Disclosed is super water absorbent polymers applied to contain water, and the polymers may further collocate with water absorbent cotton materials to accelerate water absorbent rates. The described water absorbent materials are combined with solid hydrogen fuel to complete a stable hydrogen supply device. Performance of the hydrogen supply device is not effected by inverting or tilting thereof. Even if inverting or tilting the device, the water contained in the water absorbent materials does not flow out from the device. As such, the MEA film in the fuel cell connected to the hydrogen supply device will not blocked by the water, thereby avoiding the fuel cell performance degradation even breakdown.

11 Claims, 5 Drawing Sheets

HYDROGEN SUPPLY DEVICE

CROSS REFERENCE TO RELATED APPLICATIONS

This Application claims priority of Taiwan Patent Application No. 098112619, filed on Apr. 16, 2009, the entirety of which is incorporated by reference herein.

BACKGROUND OF THE INVENTION

1. Field of the Invention

The present invention relates to a hydrogen supply device, and in particular relates to a fuel cell utilizing the same.

2. Description of the Related Art

Portable energy is required in digital products such as laptop computers, walkmans, cameras, and the likes. Desired portable energy characteristics include low cost, long energy supply, small size, light weight, and operational under a variety of environmental conditions. One type of portable energy, a conventional fuel cell, is economical and provides long energy supply. However, conventional fuel cells are limited by the inability for hydrogen supply to comply with the characteristics of desired portable energy, thus difficulty occurs when attempting to apply them to portable electronic products. Chemical hydrogen storage material can serve as a hydrogen source due to high hydrogen storage density. Solid hydrogen materials are currently popular. When a solid hydrogen fuel (combination of catalyst and sodium boron hydride) is selected, water is required for reaction to form the hydrogen as shown in Formula I below. However, the hydrogen generating mechanism has two major problems. First, difficulty occurs when attempting to provide a stable hydrogen generation rate. Thus, methods include complicated devices that dramatically increase volume and cost of the hydrogen supply device.

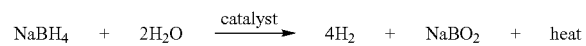

(Formula 1)

Taiwan Patent No. 98108205, however, disclosed by the inventors of this invention, discloses a more simplified method for stabilizing hydrogen generation rates.

Secondly, the hydrogen supply device is required to be fastened in one direction. Specifically, if the hydrogen supply device is inverted, tilted, or shaken, the water in the hydrogen supply device may flow to the fuel cell, thereby containing the MEA film in the fuel cell, which degrades performance. As such, portability of the fuel cell is a problem. While, those skilled in the art may adopt a hydrophobic gas-liquid separation membrane to permeate hydrogen and block water. However, fuel cell costs are increased due to expensive membrane. Furthermore, the gas-liquid separation membrane cannot totally contain the liquid water. Due to the hydrogen pressure, a little bit of water may be extruded through the membrane to degrade fuel cell performance. Accordingly, a totally solid hydrogen supply device is called for in fuel cells.

BRIEF SUMMARY OF THE INVENTION

The invention provides a hydrogen supply device, comprising a super water absorbent material for containing water, alcohol, or combinations thereof; and a solid hydrogen fuel directly contacting the super water absorbent material to generate hydrogen.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a hydrogen supply device, including a super water absorbent material to absorb water, alcohol, or combinations thereof; and solid hydrogen fuel directly contacting the super water absorbent material to generate hydrogen. The super water absorbent material can be a polymer such as polyacrylate, poly(ethylene glycol), ethylene vinyl acetate, polyurethane, poly(ethylene oxide), starch graft copolymer, or rubber blend. A little super water absorbent material may absorb a huge amount of water. For example, 1 g of sodium polyacrylate can absorb at least 25 g of water.

The solid hydrogen fuel of the invention includes a solid catalyst, solid hydride, and hydrophobic elastomer polymer. The solid hydride can be alkali/alkaline metal boron hydride, metal hydride, boron nitrogen hydride, or combinations thereof. The metal boron hydride includes $NaBH_4$, $LiBH_4$, $Ca(BH_4)_2$, $MgBH_4$, $KBH_4$, or $Al(BH_4)_3$. The metal hydride includes $LiH$, $NaH$, or $CaH_2$ and the boron nitrogen hydride includes ammonia borane, diborane, diamino diborane, $H_2B(NH_3)_2BH_4$, poly(amino borane), borazine, borane-morpholine complex, or borane-tetrahydrofuran complex. The solid catalyst can be Ru, Co, Ni, Cu, Fe, or combinations thereof, and the hydrophobic elastomer polymer includes silicone, rubber, or silicone rubber. The solid catalyst and the solid hydride are ball-grinded at high speeds, and then added the hydrophobic elastomer polymer to complete the flexible solid hydrogen fuel. For the detailed formula and manufacturing thereof, reference can be made to Taiwan Patent Application No. 98108205.

Figure 1:
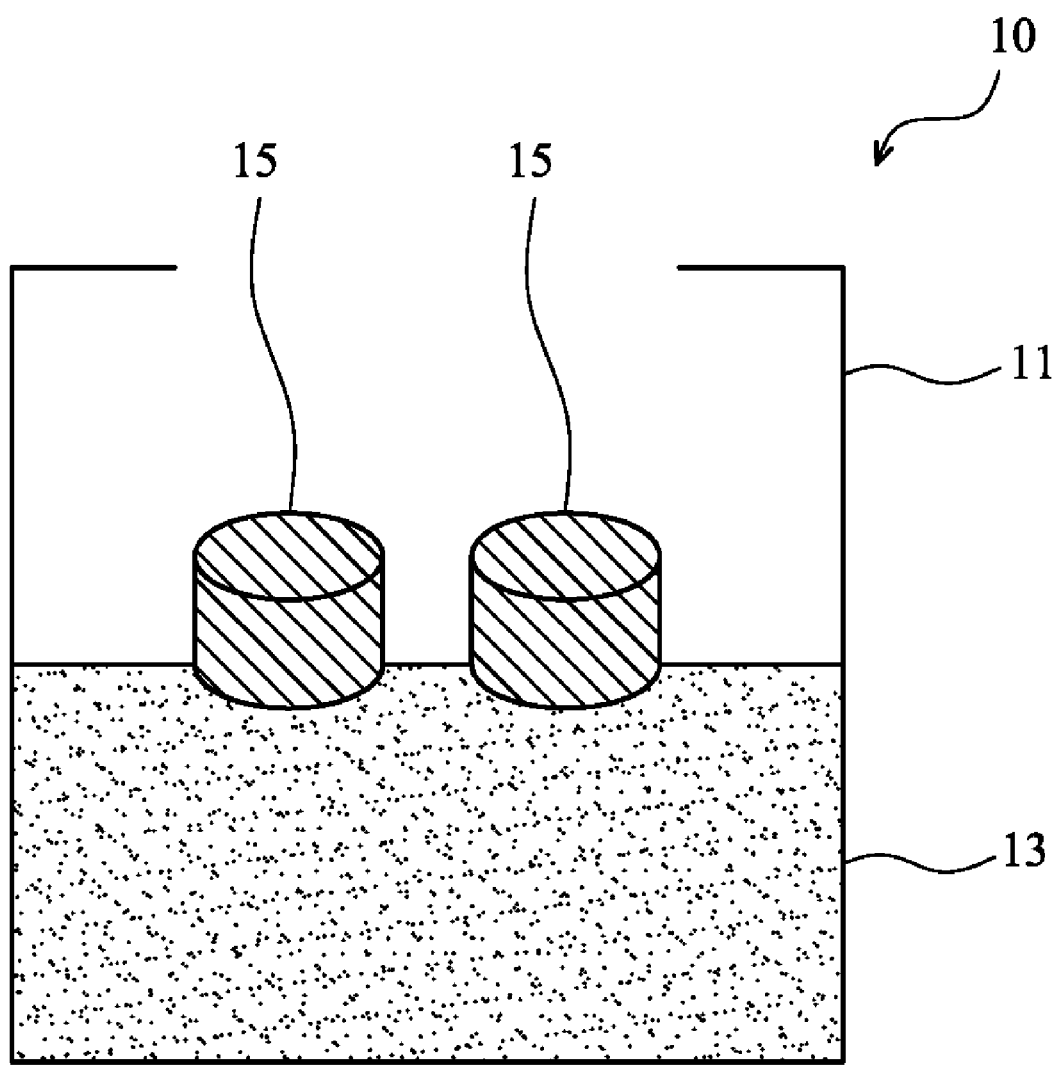
FIG. 1 is a schematic view showing the solid hydrogen supply device in one embodiment of the invention.

As shown in FIG. 1, the water absorbent polymer is charged in a vessel 11 of the hydrogen supply device 10, and added an appropriate amount of water or alcohol such as methanol or ethanol, thereby forming a hydrogel solid 13.

The liquid contained in the hydrogel solid 13 dose not flow out of the vessel 11 when tilted, inverted or shaken. The described solid hydrogen fuel 15 is charged on the hydrogel solid 13, wherein the liquid (water or alcohol) contained in the solid hydrogel 13 is absorbed by the solid hydrogen fuel 15 to react and form hydrogen. Even inverting or tilting the hydrogen supply device 10, The liquid not reacted with the solid hydrogen fuel 15 is absorbed by the water absorbent polymer, despite the hydrogen supply device 10 being tilted, inverted or shaken, and does not flow out of the vessel 11. Accordingly, the hydrogen supply device 10 may further connect to a fuel cell. As such, the fuel cell of the invention is free of the liquid problem in conventional hydrogen supply devices flowing to the fuel cell.

Figure 2:
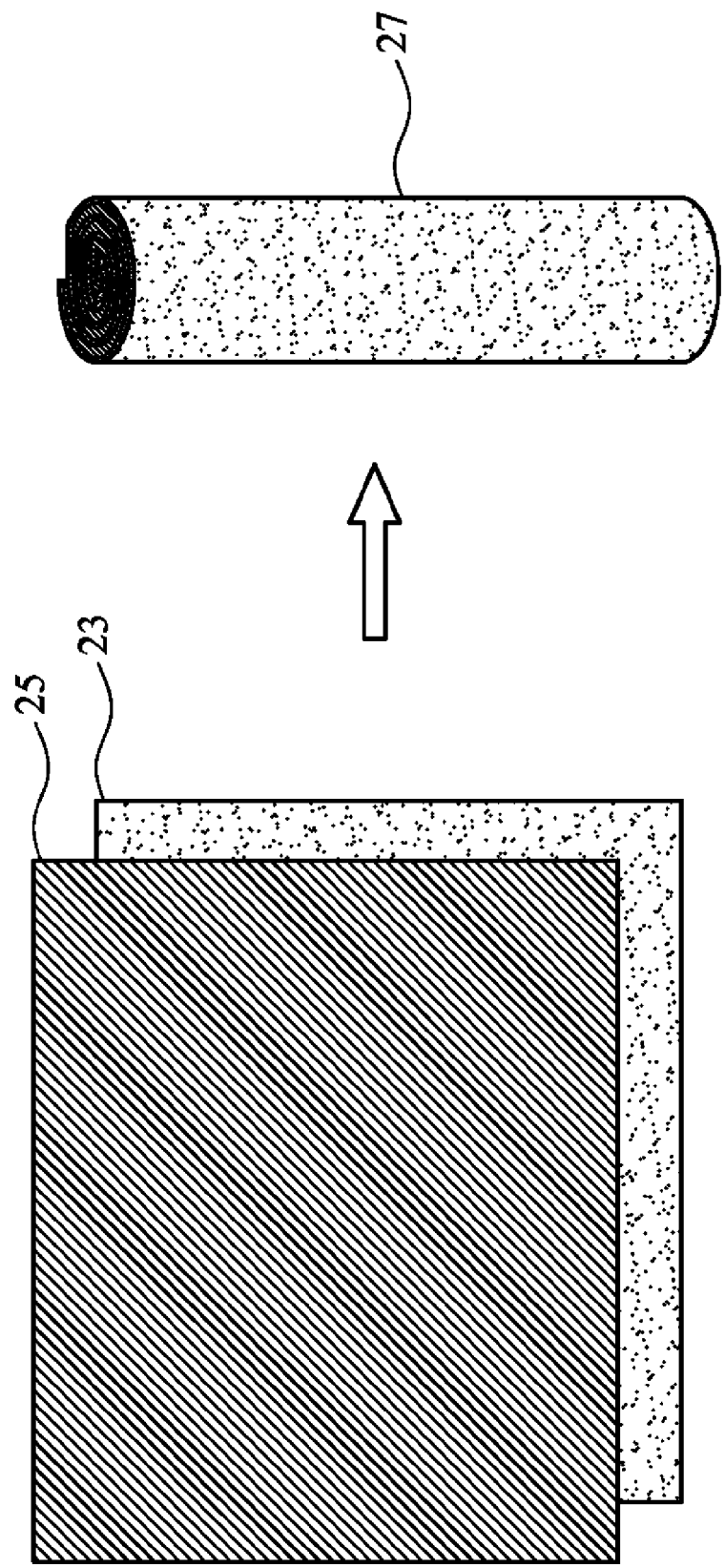
FIG. 2 is a schematic view showing the combination of the solid hydrogen fuel and the water absorbent material in one embodiment of the invention.

The described water absorbent polymer may absorb liquid at a hundred times that of its original weight, and the absorbed liquid is contained without flowing out of the polymer. However, the water absorbent polymer has low water absorbent rate, it needs a longer time to form a hydrogel solid. In another embodiment, the water absorbent material further includes a water absorbent cotton material to compensate for the slow water absorbent rate. The water absorbent cotton material has high water absorbent rate, however, it cannot totally contain water and its water absorbent amount is low. For simultaneously possessing the advantages such as having a huge absorbent amount, containing liquid, and having a fast absorbent rate, an appropriate amount of water absorbent polymer can be added on the water absorbent cotton surface to complete a sheet of water absorbent material 23, as shown in FIG. 2.

Subsequently, the solid hydrogen fuel is cut to be a sheet. Because the solid hydrogen fuel contains hydrophobic elastomer polymer, the sheet of solid hydrogen fuel 25 is flexible. The sheet of the solid hydrogen fuel 25 and the sheet of the water absorbent material 23 are stacked and rolled to form a rod-like object 27, as shown in FIG. 2. The rod-like object 27 can be stored in a waterproof bag, and the storing period depends on the waterproof effect of the bag.

Figure 3:
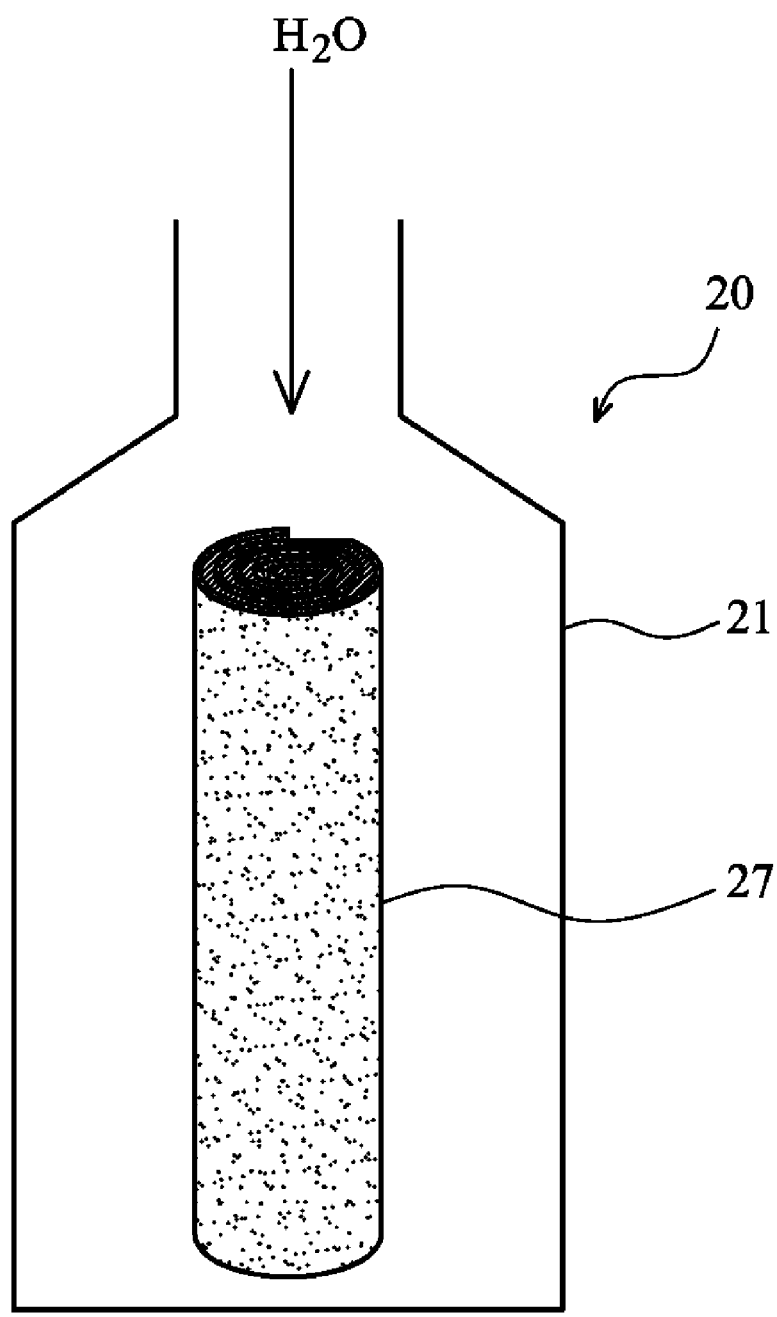
FIG. 3 is a schematic view showing the solid hydrogen supply device in one embodiment of the invention.

As shown in FIG. 3, the rod-like object 27 is charged in a vessel 21 of a hydrogen supply device 20, and added an appropriate amount of water or alcohol (methanol or ethanol). The liquid is absorbed by the water absorbent material 23, and then absorbed by the solid hydrogen fuel 25 to react and form hydrogen. The liquid not reacted with the solid hydrogen fuel 25 is absorbed by the water absorbent material 23 when the hydrogen supply device 20 is inverted or tilted and does not flow out of the vessel 21. Accordingly, the hydrogen supply device 20 may further connect to a fuel cell. As such, the fuel cell of the invention is free of the liquid problem of conventional hydrogen supply devices flowing to the fuel cell.

EXAMPLES

Example 1

1 g of water absorbent polymer (sodium polyacrylate) was charged in a vessel and then added 25 g of water. After 10 minutes, a non-flowable hydrogel was formed.

Referring to Taiwan Patent Application No. 98108205, solid hydride ($NaBH_4$) and solid catalyst ($Co^{2+}$/IR-120) were ball-grinded at a high speed, and then added silicone rubber to complete a flexible solid hydrogen fuel. The solid hydrogen fuel was pelletized to form pellets. Each pellet included 1 g of solid hydride, 0.1 g of solid catalyst, and 0.1 g of silicone rubber.

Figure 4:
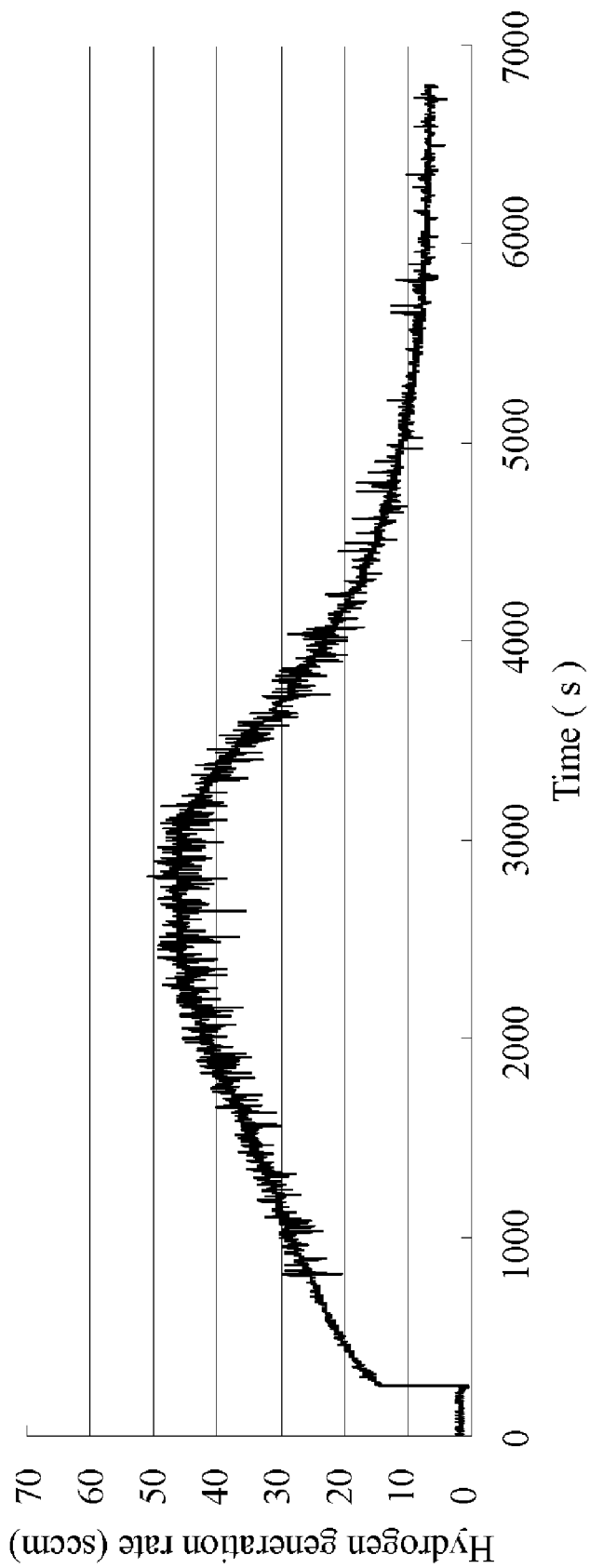
FIG. 4 is a diagram showing the curve of hydrogen generation rate versus time of the hydrogen supply device in one embodiment of the invention.

Two of the previously described pellets were charged on the described hydrogel, and the solid hydrogen fuel absorbed water and reacted to generate hydrogen. The hydrogen generation rate versus time thereof was measured and is shown in FIG. 4.

Example 2

0.5 g of water absorbent polymer (sodium polyacrylate) was uniformly dispersed on a 5 cm*13 cm*0.05 cm cosmetic cotton (KK-II, commercially available from Yani international corporation, Taiwan) to form a sheet of the water absorbent material.

Referring to Taiwan Patent Application No. 98108205, solid hydride ($NaBH_4$) and solid catalyst ($Co^{2+}$/IR-120) were ball-grinded at a high speed, and then added silicone rubber to complete a flexible solid hydrogen fuel. The solid hydrogen fuel was pressed and cut to form a sheet of the solid hydrogen fuel (4 cm*11 cm*0.1 cm).

Figure 5:
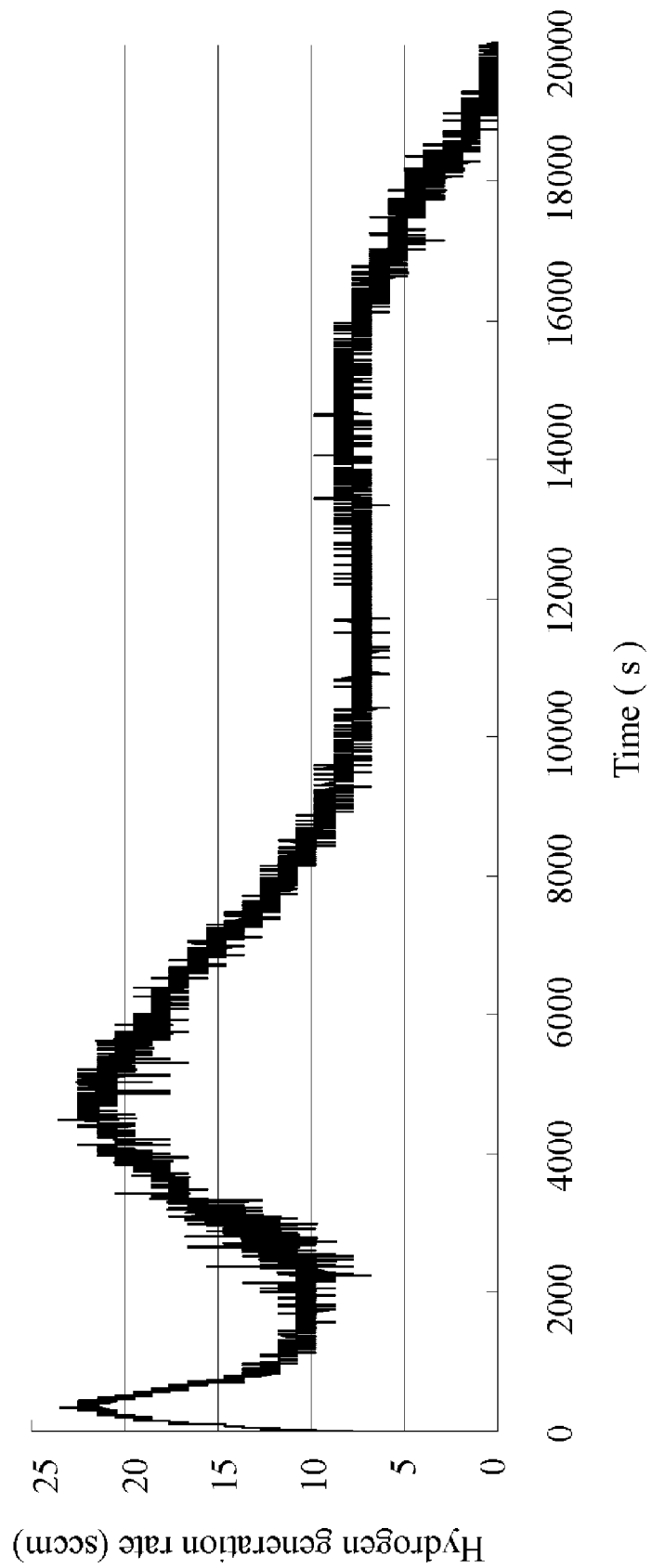
FIG. 5 is a diagram showing the curve of hydrogen generation rate versus time of the hydrogen supply device in one embodiment of the invention.

The sheet of the solid hydrogen fuel and the sheet of the water absorbent material were stacked and rolled to form a rod-like object. The rod-like object was charged in a vessel and added 20 g of water, such that the water absorbent material absorbed water rapidly. After 5 minutes, the redundant water was poured from the vessel. Subsequently, the hydrogen generation rate versus time thereof was measured and is shown in FIG. 5.

In Examples 1 and 2, no water flowed out from the vessel when inverted or tilted during the start of hydrogen generation rate measurement. Moreover, inverting or tilting the vessel did not influence the hydrogen generation rate. Accordingly, the problems such as the liquid flowing from the hydrogen supply device into the fuel cell was disappeared and a gas-liquid separation membrane as in prior art was not utilized.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hydrogen supply device, comprising:
   a super water absorbent material for containing water, alcohol, or combinations thereof; and
   a solid hydrogen fuel directly contacting the super water absorbent material to generate hydrogen,
   wherein the solid hydrogen fuel comprises solid hydride, a solid catalyst, and a hydrophobic elastomer polymer.

2. The device as claimed in claim 1, wherein the super water absorbent material is a polymer comprising polyacrylate, poly(ethylene glycol), ethylene vinyl acetate, polyurethane, poly(ethylene oxide), starch graft copolymer, or rubber blend.

3. The device as claimed in claim 2, wherein the super water absorbent material is a combination of the polymer and a cotton material.

4. The device as claimed in claim 1, wherein the alcohol comprises methanol, ethanol, or combinations thereof.

5. The device as claimed in claim 1, wherein the solid hydride comprises alkali/alkaline metal boron hydride, metal hydride, boron nitrogen hydride, or combinations thereof.

6. The device as claimed in claim 5, wherein the metal boron hydride comprises NaBH4, LiBH4, Ca(BH4)2, MgBH4, KBH4, or Al(BH4)3.

7. The device as claimed in claim 5, wherein the metal hydride comprises LiH, NaH, or CaH2.

8. The device as claimed in claim 5, wherein the boron nitrogen hydride comprises ammonia borane, diborane, diamino diborane, H2B(NH3)2BH4, poly(amino borane), borazine, borane-morpholine complex, or borane-tetrahydrofuran complex.

9. The device as claimed in claim 1, wherein the solid catalyst comprises Ru, Co, Ni, Cu, or Fe.

10. The device as claimed in claim 1, wherein the hydrophobic elastomer polymer comprises silicone, rubber, or silicone rubber.

11. The device as claimed in claim 1 being applied to a fuel cell.

* * * * *